(12) United States Patent
Kikuchi et al.

(10) Patent No.: US 8,422,137 B2
(45) Date of Patent: Apr. 16, 2013

(54) OPTICAL ELEMENT, HEAD-UP DISPLAY AND METHOD FOR PRODUCING OPTICAL ELEMENT

(75) Inventors: Ikuya Kikuchi, Kokubunji (JP); Takayuki Nomoto, Kawagoe (JP)

(73) Assignee: Pioneer Corporation, Kanagawa (JP)

( * ) Notice: Subject to any disclaimer, the term of this patent is extended or adjusted under 35 U.S.C. 154(b) by 0 days.

(21) Appl. No.: 13/380,366

(22) PCT Filed: Feb. 28, 2011

(86) PCT No.: PCT/JP2011/054491
§ 371 (c)(1),
(2), (4) Date: Dec. 22, 2011

(87) PCT Pub. No.: WO2012/117495
PCT Pub. Date: Jul. 9, 2012

(65) Prior Publication Data
US 2012/0218641 A1 Aug. 30, 2012

(51) Int. Cl.
*G02B 27/10* (2006.01)
(52) U.S. Cl.
USPC .......................................... 359/619; 359/622
(58) Field of Classification Search ................... 359/619
See application file for complete search history.

(56) References Cited

U.S. PATENT DOCUMENTS

| | | | | |
|---|---|---|---|---|
| 6,473,238 | B1 * | 10/2002 | Daniell | 359/622 |
| 2002/0126390 | A1 | 9/2002 | Matsushita et al. | |
| 2005/0237615 | A1 | 10/2005 | Urey et al. | |
| 2005/0248849 | A1 | 11/2005 | Urey et al. | |
| 2007/0103747 | A1 | 5/2007 | Powell et al. | |
| 2008/0212194 | A1 | 9/2008 | Powell et al. | |
| 2008/0218822 | A1 | 9/2008 | Powell et al. | |

FOREIGN PATENT DOCUMENTS

| | | |
|---|---|---|
| JP | 08-166556 | 6/1996 |
| JP | 2000-098102 | 4/2000 |
| JP | 2002-214405 | 7/2002 |
| JP | 2007-523369 | 8/2007 |
| JP | 2010-145745 | 7/2010 |

OTHER PUBLICATIONS

International Search Report, PCT/JP2011/054491, Mar. 22, 2011.
H. Urey et al., "Microlens-array-based exit-pupil expander for full-color displays"., Applied Optics vol. 44, No. 23, p. 4930-4936, Aug. 10, 2005.

* cited by examiner

*Primary Examiner* — James Jones
(74) *Attorney, Agent, or Firm* — Young & Thompson

(57) ABSTRACT

An optical element includes first and second microlens array units on which microlenses are arranged. The microlenses are formed by lens contour having a polygonal shape in a plan view. The first and second microlens array units are arranged opposite to each other at a position where a distance between the first and second microlens array units is at least longer than a focal distance of the microlens, and are formed so that a direction of vertices of the lens contour of the microlens arranged on the first microlens array unit is different from a direction of vertices of the lens contour of the microlens arranged on the second microlens array unit. According to the above optical element, it is possible to appropriately suppress an influence of shift of the position between the first and second microlens array units, and it becomes possible to produce the optical element with ease.

16 Claims, 12 Drawing Sheets

ROTATED BY 30 DEGREES

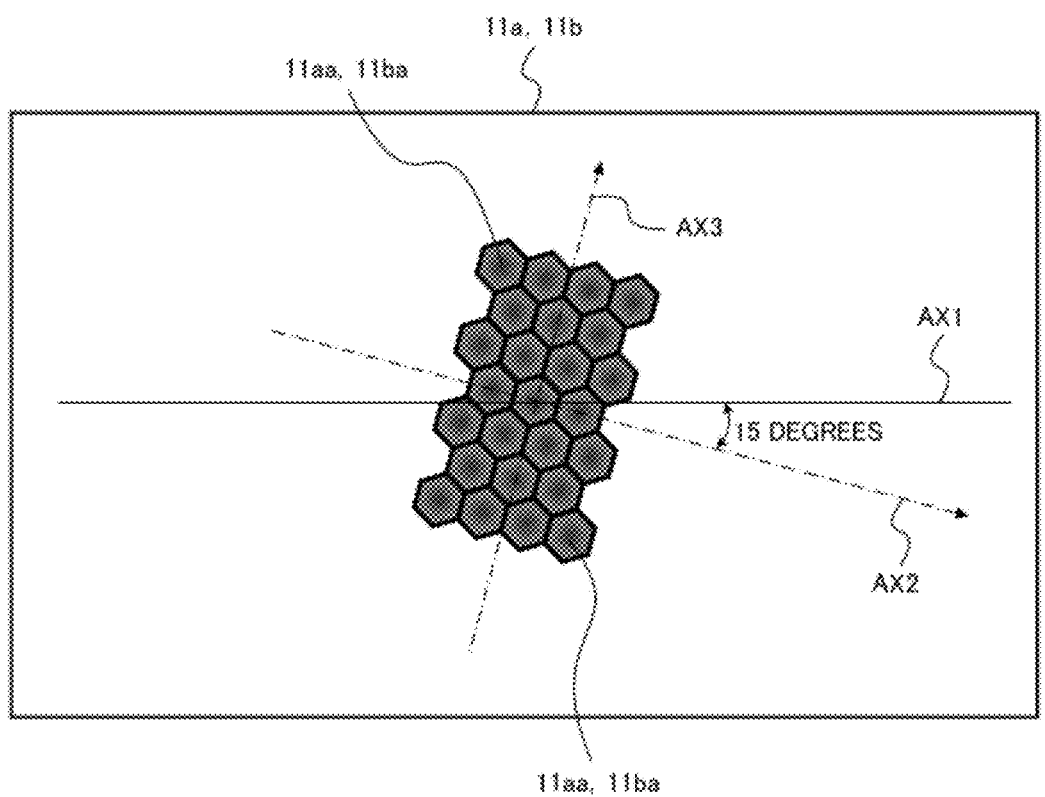

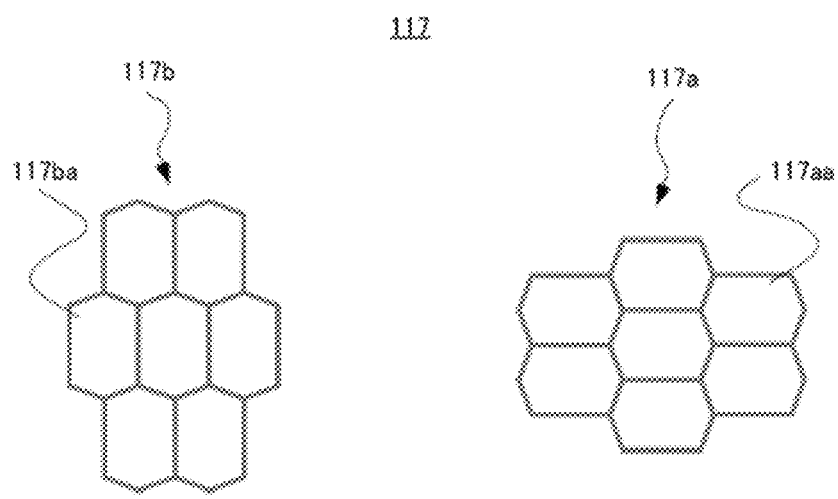
FIG. 12A
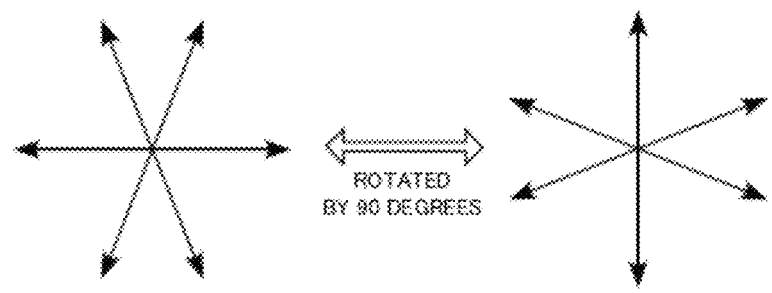
FIG. 12B  ⟷ ROTATED BY 90 DEGREES

OPTICAL ELEMENT, HEAD-UP DISPLAY AND METHOD FOR PRODUCING OPTICAL ELEMENT

TECHNICAL FIELD

The present invention relates to an optical element using a microlens array.

BACKGROUND TECHNIQUE

Conventionally, there is proposed a technique for applying a transmissive screen using a microlens array to a head-up display and a laser projector. When the transmissive screen is used, there is an advantage that it is possible to suppress an influence of a speckle noise compared with a case of using a diffuser. For example, in Patent Reference-1, there is proposed an image forming device including a light source of a laser, a laser projector which projects an image formed by an array of plural pixels, and a microlens array on which plural microlenses are arranged. When the microlens array is used, it is possible to appropriately disperse an incident light and freely design a necessary diffusing angle.

Meanwhile, in Patent References 2 and 3 and Non-Patent Reference 1, there is proposed a screen formed by two microlens arrays or two diffraction gratings, for example. Specifically, Non-Patent Reference 1 discloses that though an uneven brightness tends to occur when only one microlens array is used, the uneven brightness can be suppressed by using two microlens arrays.

PRIOR ART REFERENCE

Patent Reference

Patent Reference-1: Japanese Patent Application Laid-open under No. 2010-145745
Patent Reference-2: Japanese Patent Application Laid-open under No. 08-16656
Patent Reference-3: Japanese Patent Application Laid-open under No. 2007-523369

Non-Patent Reference

Non-Patent Reference 1: H. Urey and K. D. Powell, "Microlens-array-based exit-pupil expander for full-color displays", APPLIED OPTICS Vol. 44, No. 23, p. 4930-4936

DISCLOSURE OF INVENTION

Problem to be Solved by the Invention

Basically, as for the above conventional techniques using the screen formed by the two microlens arrays (including the screen formed by the two diffraction gratings. The same will apply hereinafter), the two microlens arrays are spaced at a focal distance of the microlens, and the two microlens arrays are arranged so that a direction of vertices of a hexagonal shape or a tetragonal shape being a lens contour of the microlens coincides. By the above configuration of the conventional techniques, it is necessary to exactly adjust the position of the two microlens arrays. This is because, if the distance between the two microlens arrays does not coincide with the focal distance or the direction of the vertices of the lens contour of the microlenses does not coincide, there sometimes occurs such a problem that the microlens takes in an unnecessary light or an influence of the inconsistency is perceived. Therefore, by the conventional techniques, there is a tendency that the time and cost of producing the screen increase.

The present invention has been achieved in order to solve the above problem. It is an object of the present invention to provide an optical element, a head-up display and a method for producing an optical element which can suppress an influence of a shift of a position between microlens arrays and can easily be produced.

Means for Solving the Problem

In the invention according to claim 1, an optical element includes a first microlens array unit and a second microlens array unit on which plural microlenses are arranged, wherein the plural microlenses are formed by a lens contour having a polygonal shape in a plan view, and wherein the first and second microlens array units are arranged opposite to each other at a position where a distance between the first and second microlens array units is at least longer than a focal distance of the microlens, and are formed so that a direction of vertices of the lens contour of the microlens arranged on the first microlens array unit is different from a direction of vertices of the lens contour of the microlens arranged on the second microlens array unit.

In the invention according to claim 11, a head-up display includes the optical element according to claim 1 and makes a user perceive an image formed by the optical element as a virtual image at an eye position of the user.

In the invention according to claim 12, a method for producing an optical element including a first microlens array unit and a second microlens array unit on which plural microlenses are arranged, includes: a first process which forms the plural microlenses on one side, which are arranged in such a state that a polygonal shape being a lens contour of the microlens is rotated by half of a predetermined degrees, so as to produce the first and second microlens array units; and a second process which arranges the first and second microlens array units produced in the first process so that the first and second microlens array units are positioned opposite to each other at a position where a distance between the first and second microlens array units is at least longer than a focal distance of the microlens, so as to produce the optical element.

In the invention according to claim 13, a method for producing an optical element including a first microlens array unit and a second microlens array unit on which plural microlenses are arranged, includes: a first process which forms the plural microlenses on one side so as to produce the first and second microlens array units; and a second process which arranges the first and second microlens array units opposite to each other at a position where a distance between the first and second microlens array units is at least longer than a focal distance of the microlens, and arranges the first and second microlens array units so that an angle difference between a direction of vertices of a polygonal shape being a lens contour of the microlens formed on the first microlens array unit and a direction of vertices of a polygonal shape being a lens contour of the microlens formed on the second microlens array unit becomes a predetermined angle, so as to produce the optical element.

In the invention according to claim 14, an optical element includes a first microlens array unit and a second microlens array unit on which plural microlenses are arranged, wherein the plural microlenses are formed by a lens contour having a regular polygonal shape in a plan view, and wherein the first and second microlens array units are arranged opposite to each other at a position where a distance between the first and second microlens array units is at least longer than a focal distance of the microlens, and are formed so that an angle difference between a direction of vertices of the lens contour of the microlens arranged on the first microlens array unit and a direction of vertices of the lens contour of the microlens arranged on the second microlens array unit becomes half of an internal angle of the regular polygonal shape.

In the invention according to claim 15, an optical element includes a first microlens array unit and a second microlens array unit on which plural microlenses are arranged at equal distances, wherein the microlenses are arranged around one microlens and are adjacently arranged at each predetermined angle with respect to vertices of the one microlens, wherein the first and second microlens array units are arranged opposite to each other at a position where a distance between the first and second microlens array units is at least longer than a focal distance of the microlens, and wherein the microlenses arranged on the first microlens array unit and the microlenses arranged on the second microlens array unit are shifted by half of the predetermined angle with respect to the one microlens.

BRIEF DESCRIPTION OF THE DRAWINGS

FIG. 5 shows a diagram for explaining a method for producing a screen according to an embodiment.

FIGS. 12A and 12 B show concrete configurations of a screen according to a sixth modification.

DETAILED DESCRIPTION OF THE PREFERRED EMBODIMENTS

Figure 1:
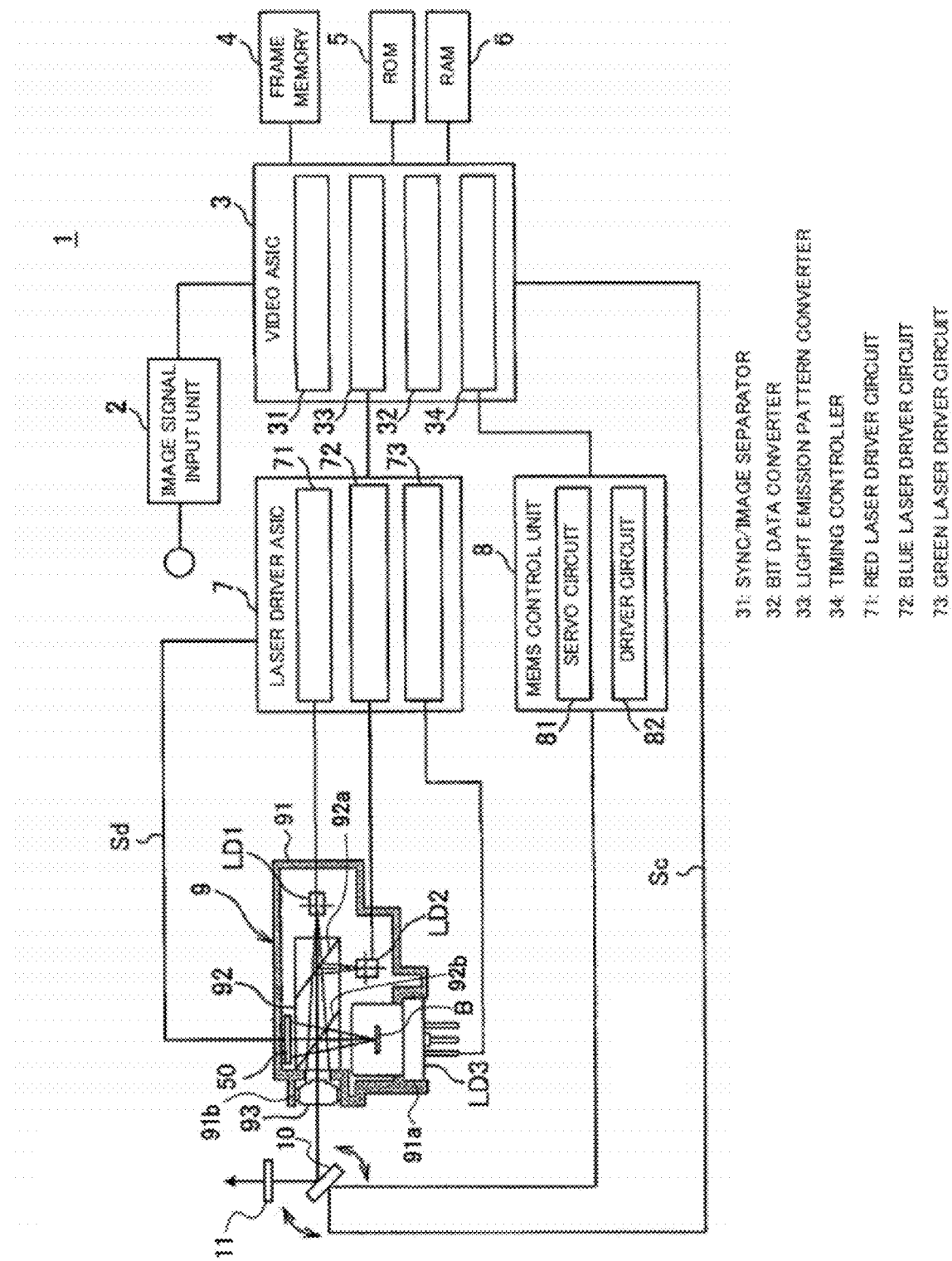
FIG. 1 shows a configuration of an image display device according to an embodiment.

According to one aspect of the present invention, there is provided an optical element, including a first microlens array unit and a second microlens array unit on which plural microlenses are arranged, wherein the plural microlenses are formed by a lens contour having a polygonal shape in a plan view, and wherein the first and second microlens array units are arranged opposite to each other at a position where a distance between the first and second microlens array units is at least longer than a focal distance of the microlens, and are formed so that a direction of vertices of the lens contour of the microlens arranged on the first microlens array unit is different from a direction of vertices of the lens contour of the microlens arranged on the second microlens array unit.

The above optical element includes the first and second microlens array units on which the plural microlenses are arranged. In other words, the optical element corresponds to a screen. The plural microlenses are formed by the lens contour having the polygonal shape in the plan view. The lens contour indicates a contour (outline) of one microlens which is formed on the first and second microlens array units. The same will apply hereinafter. The first and second microlens array units are arranged opposite to each other at the position where the distance between the first and second microlens array units is at least longer than the focal distance of the microlens. Additionally, the first and second microlens array units are formed so that the angle difference between the direction of the vertices of the polygonal shape being the lens contour of the microlens arranged on the first microlens array unit and the direction of the vertices of the polygonal shape being the lens contour of the microlens arranged on the second microlens array unit becomes a predetermined angle. Namely, the plural microlens are arranged on the first and second microlens array units so as to satisfy such a relationship that the polygonal shapes being the lens contours are rotated by the predetermined angle with each other.

According to the above optical element, by using the first and second microlens array units which are arranged opposite to each other at the position where the distance between the first and second microlens array units is at least longer than the focal distance of the microlens, it is possible to appropriately disperse the light, and it is possible to form the uniform and even image. Additionally, since the direction of the vertices of the lens contour of the first microlens array unit is different from the direction of the vertices of the lens contour of on the second microlens array unit, it is possible to suppress the unnecessary interference on the incident side due to the image of the polygonal shape, and it becomes possible to appropriately suppress the influence of the shift of the position between the first and second microlens array units. Additionally, according to the above optical element, since it is not necessary to exactly adjust the position of the first and second microlens array units, it becomes possible to produce the optical element with ease and at low cost.

In a preferred example of the above optical element, the microlenses of the first and second microlens array units are formed by the lens contour having the polygonal shape, and are arranged so that sides of the polygonal shape are adjacent to each other.

In a preferred example of the above optical element, the first and second microlens array units are arranged opposite to each other at a position where the distance between the first and second microlens array units is equal to or larger than 1.5 times the focal distance and equal to or smaller than 3 times the focal distance.

In a manner of the above optical element, the polygonal shape is a regular hexagonal shape, and an angle difference between the direction of the vertices of the lens contour of the microlens arranged on the first microlens array unit and the direction of the vertices of the lens contour of the microlens arranged on the second microlens array unit is substantially 30 degrees or substantially 90 degrees. Therefore, it becomes possible to effectively suppress the influence of the shift of the position between the first and second microlens array units.

In another manner of the above optical element, the polygonal shape is a square shape, and an angle difference between the direction of the vertices of the lens contour of the microlens arranged on the first microlens array unit and the direction of the vertices of the lens contour of the microlens arranged on the second microlens array unit is substantially 45 degrees or substantially 135 degrees. Therefore, it becomes possible to effectively suppress the influence of the shift of the position between the first and second microlens array units.

In another manner of the above optical element, the optical element further comprises a first lens array and a second lens array. The first lens array has the first microlens array unit on one side, and the second lens array has the second microlens array unit on one side. In other words, the first and second microlens array units are separated, and the plural microlenses are formed on one side of the first and second microlens array units.

In a preferred example of the above optical element, the first microlens array unit is formed on a side of the first lens array which faces the second lens array, and the second microlens array unit is formed on a side of the second lens array which faces the first lens array. In other words, the plural microlenses are formed on the sides of the first and second microlens array units, which face each other.

In a preferred example of the above optical element, the first microlens array unit is formed on a side of the first lens array which does not face a side of the second lens array on which the second microlens array unit is formed. In other words, the plural misrolenses of one of the first and second microlens array units are formed on the side which faces the other, and the plural misrolenses of the other are formed on the side which does not face the one.

In a preferred example of the above optical element, the first microlens array unit is formed on a side of the first lens array which does not face the second lens array, and the second microlens array unit is formed on a side of the second lens array which does not face the first lens array. In other words, the plural microlenses are formed on the sides of the first and second microlens array units, which do not face each other.

In another manner of the above optical element, the first microlens array unit is formed on one side of the optical element, and the second microlens array unit is formed on the other side of the optical element. In other words, the first and second microlens array units are integrated, and the plural microlenses are formed on both sides of the optical element. According to the manner, since the two microlens array units are integrated, it is only necessary to produce one component on which the microlens arrays are formed. Therefore, it becomes possible to reduce the cost necessary for the optical element more effectively.

The above optical element can be preferably applied to a head-up display which makes a user perceive an image as a virtual image at an eye position of the user.

According to another aspect of the present invention, there is provided a method for producing an optical element including a first microlens array unit and a second microlens array unit on which plural microlenses are arranged, including: a first process which forms the plural microlenses on one side, which are arranged in such a state that a polygonal shape being a lens contour of the microlens is rotated by half of a predetermined degrees, so as to produce the first and second microlens array units; and a second process which arranges the first and second microlens array units produced in the first process so that the first and second microlens array units are positioned opposite to each other at a position where a distance between the first and second microlens array units is at least longer than a focal distance of the microlens, so as to produce the optical element.

According to still another aspect of the present invention, there is provided a method for producing an optical element including a first microlens array unit and a second microlens array unit on which plural microlenses are arranged, including: a first process which forms the plural microlenses on one side so as to produce the first and second microlens array units; and a second process which arranges the first and second microlens array units opposite to each other at a position where a distance between the first and second microlens array units is at least longer than a focal distance of the microlens, and arranges the first and second microlens array units so that an angle difference between a direction of vertices of a polygonal shape being a lens contour of the microlens formed on the first microlens array unit and a direction of vertices of a polygonal shape being a lens contour of the microlens formed on the second microlens array unit becomes a predetermined angle, so as to produce the optical element.

According to the above method for producing the optical element, it becomes possible to produce the optical element with ease and at low cost.

According to still another aspect of the present invention, there is provided an optical element, including a first microlens array unit and a second microlens array unit on which plural microlenses are arranged, wherein the plural microlenses are formed by a lens contour having a regular polygonal shape in a plan view, and wherein the first and second microlens array units are arranged opposite to each other at a position where a distance between the first and second microlens array units is at least longer than a focal distance of the microlenses, and are formed so that an angle difference between a direction of vertices of the lens contour of the microlens arranged on the first microlens array unit and a direction of vertices of the lens contour of the microlens arranged on the second microlens array unit becomes half of an internal angle of the regular polygonal shape.

According to still another aspect of the present invention, there is provided an optical element, including a first microlens array unit and a second microlens array unit on which plural microlenses are arranged at equal distances, wherein the microlenses are arranged around one microlens and are adjacently arranged at each predetermined angle with respect to vertices of the one microlens, wherein the first and second microlens array units are arranged opposite to each other at a position where a distance between the first and second microlens array units is at least longer than a focal distance of the microlens, and wherein the microlens arranged on the first microlens array unit and the microlens arranged on the second microlens array unit are shifted by half of the predetermined angle with respect to the one microlens.

Preferably, a space between the microlenses formed on the first and second microlens array units is masked so that a light does not go through the space.

Embodiment

A preferred embodiment of the present invention will be explained hereinafter with reference to the drawings.

[Configuration of Image Display Device]

FIG. 1 shows a configuration of an image display device to which the optical element in the embodiment is applied. As shown in FIG. 1, the image display device 1 includes an image signal input unit 2, a video ASIC 3, a frame memory 4, a ROM 5, a RAM 6, a laser driver ASIC 7, a MEMS control unit 8, a laser light source unit 9, a MEMS mirror 10 and a screen 11.

The image display device 1 is applied to a head-up display, for example. The head-up display makes a driver perceive an image as a virtual image at an eye position (eye point) of the driver.

The image signal input unit 2 receives the image signal from the outside and outputs the image signal to video ASIC 3.

The video ASIC 3 is formed as an ASIC (Application Specific Integrated Circuit) and controls the laser driver ASIC 7 and the MEMS control unit 8 based on the image signal inputted by the image signal input unit 2 and a scanning position information Sc inputted by the MEMS mirror 10. The video ASIC 3 includes a sync/image separator 31, a bit data converter 32, a light emission pattern converter 33 and a timing controller 34.

The sync/image separator 31 separates the image signal inputted by the image signal input unit 2 into a synchronous signal and image data displayed on a screen as an image displaying unit, and writes the image data into the frame memory 4.

The bit data converter 32 reads out the image data written into the frame memory 4, and converts the image data into bit data.

The light emission pattern converter 33 converts the bit data converted by the bit data converter 32 into a signal indicating a light emission pattern of each laser.

The timing controller 34 controls an operation timing of the sync/image separator 31 and the bit data converter 32. Additionally, the timing controller 34 also controls an operation timing of the MEMS control unit 8, described later.

The image data separated by the sync/image separator 31 is written into the frame memory 4. The ROM 5 stores a control program and data for operating the video ASIC 3. The RAM 6 is used as a working memory when the video ASIC 3 operates, and the video ASIC 3 sequentially reads and writes various data of the RAM 6.

The laser driver ASIC 7 is formed as an ASIC and generates a signal for driving laser diodes provided in the laser light source unit 9 which will be described later. The laser driver ASIC 7 includes a red laser driver circuit 71, a blue laser driver circuit 72 and a green laser driver circuit 73.

The red laser driver circuit 71 drives a red laser LD1 based on the signal outputted by the light emission pattern converter 33. The blue laser driver circuit 72 drives a blue laser LD2 based on the signal outputted by the light emission pattern converter 33. The green laser driver circuit 73 drives a green laser LD3 based on the signal outputted by the light emission pattern converter 33.

The MEMS control unit 8 controls the MEMS mirror 10 based on the signal outputted by the timing controller 34. The MEMS control unit 8 includes a servo circuit 81 and a driver circuit 82.

The servo circuit 81 controls the operation of the MEMS mirror 10 based on the signal from the timing controller 34.

The driver circuit 82 amplifies the control signal of the MEMS mirror 10, which is outputted by the servo circuit 81, to a predetermined level, and outputs the amplified signal.

The laser light source unit 9 emits the laser light to the MEMS mirror 10 based on the drive signal outputted by the laser driver ASIC 7.

The MEMS mirror 10 serving as a scanning unit reflects the laser light emitted by the laser light source unit 9 to the screen 11. Therefore, the MEMS mirror 10 forms the image to display on the screen 11. Additionally, the MEMS mirror 10 operates to perform scanning on the screen 11 based on the control by the MEMS control unit 8 for displaying the image inputted to the image signal input unit 2, and outputs the scanning position information (for example, an angle of the mirror 10) to the video ASIC 3.

The screen 11 is an example of the optical element according to the present invention, and is formed as a transmissive screen. The screen 11 includes the microlens array unit (which is not shown), on which the plural microlenses are arranged. The microlens array unit moderately disperses the incident light. Concretely, the microlens array unit diffuses the light by a diffusing angle in accordance with a curvature of the lens. The curvature of the lens of the microlens array unit is preliminarily designed in accordance with a necessary diffusing angle. The screen 11 will be described in details, later.

Actually, the image display device 1 makes the driver perceive the image corresponding to the light, which is outgoing from the screen 11 and is then reflected by a reflective mirror (combiner) or is then expanded by an expander, at the eye position (eye point) of the driver.

Next, a description will be given of a concrete configuration of the laser light source unit 9. The laser light source unit 9 includes a case 91, a wavelength selective element 92, a collimator lens 93, a red laser LD1, a blue laser LD2, a green laser LD3 and a light receiving element 50 for a monitor (hereinafter simply referred to as "light receiving element").

The case 91 has a substantially box shape and is formed by a resin. The case 91 is provided with a CAN fixing part 91a and a collimator fixing part 91b. The CAN fixing part 91a is formed as a through-hole for fixing the green laser LD3 and has a concave shaped cross-section. The collimator fixing part 91b is formed as a through-hole provided on a plane perpendicular to the CAN fixing part 91a and has a concave shaped cross-section.

The wavelength selective element 92 serving as a composite element is formed by a trichroic prism, for example, and is provided with a reflecting surface 92a and a reflecting surface 92b. The reflecting surface 92a transmits the laser light emitted by the red laser LD1 to the collimator lens 93, and reflects the laser light emitted by the blue laser LD2 to the collimator lens 93. The reflecting surface 92b transmits a large part of the laser lights emitted by the red laser LD1 and the blue laser LD2 to the collimator lens 93, and reflects a small part of them to the light receiving element 50. Additionally, the reflecting surface 92b transmits a large part of the laser light emitted by the green laser LD3 to the collimator lens 93, and reflects a small part of it to the light receiving element 50. Thus, the emitted light from each laser is superimposed, and the superimposed light enters the collimator lens 93 and the light receiving element 50. The wavelength selective element 92 is provided near the collimator fixing part 91b in the case 91.

The collimator lens 93 converts the laser light from the wavelength selective element 92 into a parallel light, and emits the parallel light to the MEMS mirror 10. The collimator lens 93 is fixed on the collimator fixing part 91b in the case 91 by an ultraviolet adhesive. Namely, the collimator lens 93 is provided behind the composite element.

The red laser LD1 serving as the laser light source emits the red laser light. The red laser LD1 is fixed on the same axis as the wavelength selective element 92 and the collimator lens 93 in the case 91, in such a state that a semiconductor laser light source remains in a chip state or the chip is placed on a submount.

The blue laser LD2 serving as the laser light source emits the blue laser light. The blue laser LD2 is fixed at the position where the emitted light can be reflected to the collimator lens 93 by the reflecting surface 92a, in such a state that the semiconductor laser light source remains in the chip state or the chip is placed on the submount. The position of the blue laser LD2 may be replaced with the position of the red laser LD1.

The green laser LD3 serving as the laser light source is mounted on a CAN package or a frame package, and emits the green laser light. The green laser LD3 is provided with a semiconductor laser light source chip B in the CAN package which generates the green laser light, and is fixed on the CAN fixing part 91a in the case 91.

The light receiving element 50 receives a part of the laser light emitted by each laser light source. The light receiving element 50 is a photoelectric conversion element such as a photodetector, and supplies the laser driver ASIC 7 with a detecting signal Sd being an electrical signal in accordance with the amount of the incident laser light. Actually, the light receiving element 50 receives one of the red laser light, the blue laser light and the green laser light in a predetermined order at the time of adjusting the power, and outputs the detecting signal Sd corresponding to the amount of the one laser light. The laser driver ASIC 7 adjusts the power of the red laser LD1, the blue laser LD2 and the green laser LD3, based on the detecting signal Sd.

For example, when the power of the red laser LD1 is adjusted, the laser driver ASIC 7 operates only the red laser driver circuit 71 and makes the red laser LD1 emit the red laser light by supplying the driving current to the red laser LD1. The light receiving element 50 receives a part of the red laser light, and feeds the detecting signal Sd in accordance with the amount of the light back to the laser driver ASIC 7. The laser driver ASIC 7 adjusts the driving current which is supplied to the red laser LD1 from the red laser driver circuit 71 so that the amount of the light corresponding to the detecting signal Sd becomes an appropriate amount of the light. Thus, the power is adjusted. Similarly, the power of the blue laser LD2 and the power of the green laser LD3 are adjusted.

[Configuration of Screen]

Next, a concrete description will be given of a configuration of the screen 11 according to the embodiment.

Figure 2:
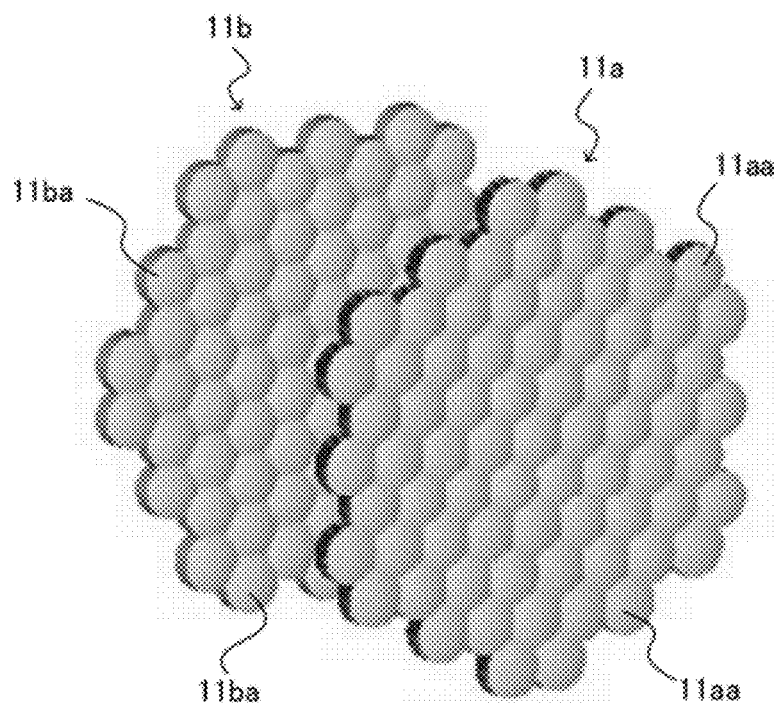
FIG. 2 shows a perspective view of a screen according to an embodiment.

FIG. 2 shows a perspective view of the screen 11 according to the embodiment. As shown in FIG. 2, the screen 11 includes two microlens array units 11*a* and 11*b* which are arranged opposite to each other at a position where a distance between the microlens array units 11*a* and 11*b* is a predetermined distance. The microlens array units 11*a* and 11*b* have a substantially discoid shape. Additionally, plural microlenses 11*aa* and 11*ba* formed by a lens contour having a regular hexagonal shape in a plan view are formed on one side of the microlens array units 11*a* and 11*b* in a lattice pattern.

Figure 3A:
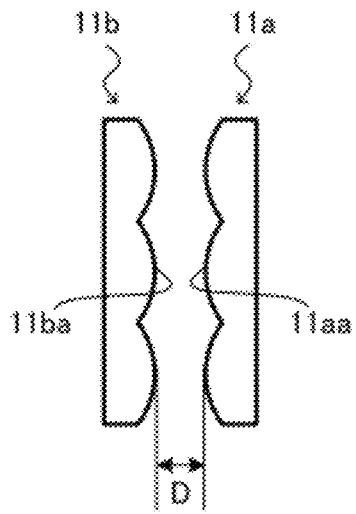
FIGS. 3A to 3C show configurations of microlens array units according to an embodiment.
Figure 3B:
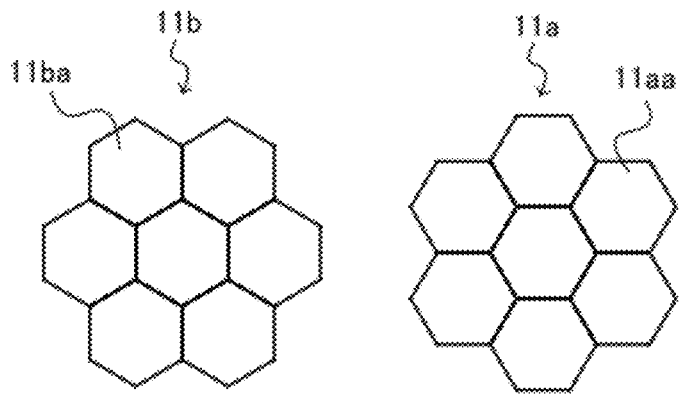
Figure 3C:
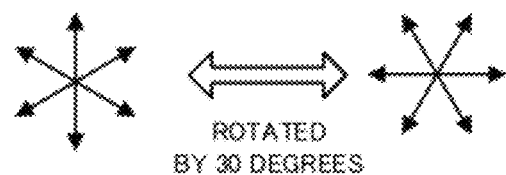

FIGS. 3A to 3C are diagrams showing a concrete configuration of the microlens array units 11*a* and 11*b* according to the embodiment. FIG. 3A shows a cross-sectional view of the microlens array units 11*a* and 11*b* which are cut by a plane normal to a traveling direction of the light. Concretely, the cross-sectional view shows parts of the microlens array units 11*a* and 11*b* in an enlarged manner. As shown in FIG. 3A, the microlens array units 11*a* and 11*b* are arranged opposite to each other so that the sides on which the plural microlenses 11*aa* and 11*ba* are formed face each other. Namely, the plural microlenses 11*aa* are formed on the side of the microlens array unit 11*a* which faces the microlens array unit 11*b*, and the plural microlenses 11*ba* are formed on the side of the microlens array unit 11*b* which faces the microlens array unit 11*a*. Additionally, the microlens array units 11*a* and 11*b* are arranged opposite to each other at the position where the distance between the microlens array units 11*a* and 11*b* is a distance D. In the embodiment, the microlens array units 11*a* and 11*b* are arranged opposite to each other at the position where the distance D is at least longer than a focal distance of the microlenses 11*aa* and 11*ba*. For example, the microlens array units 11*a* and 11*b* are arranged at the position where the distance D is equal to or larger than 1.5 times the focal distance and equal to or smaller than 3 times the focal distance.

FIG. 3B shows a plan view of the microlens array units 11*a* and 11*b*. Concretely, the plan view shows parts of the microlens array units 11*a* and 11*b*, which are observed in the direction along the traveling direction of the light, in an enlarged manner. As shown in FIG. 3B, the plural microlenses 11*aa* and 11*ba* which are formed by the lens contour having the regular hexagonal shape in the plan view are arranged on the microlens array units 11*a* and 11*b* in the lattice pattern. The plural regular hexagonal shapes being the lens contour of the microlenses 11*aa* and 11*ba* have the same shape (namely, the same size). Additionally, the microlenses 11*aa* and 11*ba* are formed to have the same curvature of the lens, for example.

Here, the direction of the vertices of the regular hexagonal shape being the lens contour of the microlenses 11*aa* and 11*ba* is defined as shown in FIG. 3C. The direction of the vertices is defined by a direction from a center point (center of gravity) of the regular hexagon toward each vertex of the regular hexagon. The right part of FIG. 3C shows the direction of the vertices of the regular hexagonal shape being the lens contour of the microlens 11*aa*, and the left part of FIG. 3C shows the direction of the vertices of the regular hexagonal shape being the lens contour of the microlens 11*ba*. Since the plural microlenses 11*aa* and 11*ba* are arranged on the microlens array units 11*a* and 11*b* in the lattice pattern (namely, the plural microlenses 11*aa* and 11*ba* are arranged in the same direction), all of the directions of the vertices of the regular hexagonal shape in the microlens array units 11*a* and 11*b* are the same.

As shown in FIGS. 3B and 3C, in the embodiment, the microlens array units 11*a* and 11*b* are formed so that an angle difference between the direction of the vertices of the regular hexagonal shape being the lens contour of the microlens 11*aa* arranged on the microlens array unit 11*a* and the direction of the vertices of the regular hexagonal shape being the lens contour of the microlens 11*ba* arranged on the microlens array unit 11*b* becomes a predetermined angle. Concretely, in the embodiment, the microlens array units 11*a* and 11*b* are formed so that the angle difference between the direction of the vertices of the regular hexagonal shape being the lens contour of the microlens 11*aa* and the direction of the vertices of the regular hexagonal shape being the lens contour of the microlens 11*ba* becomes 30 degrees. Namely, the plural microlenses 11*aa* and 11*ba* are arranged on the microlens array units 11*a* and 11*b* so as to satisfy such a relationship that the regular hexagonal shapes being the lens contours of the microlenses 11*aa* and 11*ba* are rotated by 30 degrees with respect to each other.

[Operation and Effect of Screen]

Next, a description will be given of the operation and the effect of the screen 11 according to the embodiment, with reference to FIGS. 4A to 4C. Hereinafter, a description will be given of an example in such a case that the light enters the microlens array unit 11*a* prior to the microlens array unit 11*b*, and the light emitted by the microlens array unit 11*a* enters the microlens array unit 11*b*.

Figure 4A:
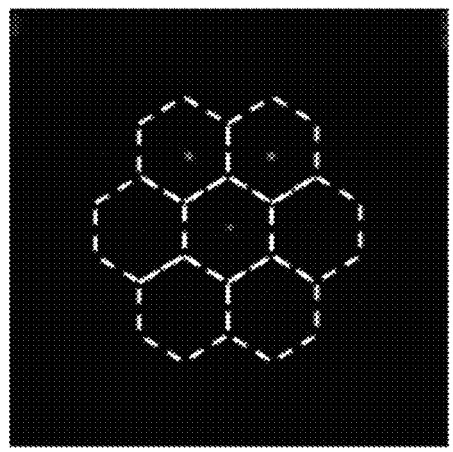
FIGS. 4A to 4C show diagrams for explaining an operation and an effect of a screen according to an embodiment.

FIG. 4A shows a light intensity distribution on a focal plane of the microlens array unit 11*a* (The focal plane indicates the plane which is opposed to the microlens array unit 11*a* and is located at the focal point of the microlens 11*aa*. The same will apply hereinafter). In FIG. 4A, as a matter of convenience of the explanations, the lens contours of the plural microlens 11*aa* arranged on the microlens array unit 11*a* are represented by broken lines. FIG. 4B shows a light intensity distribution on a plane far enough away from the focal plane of the microlens array unit 11*a*. Concretely, the plane is opposed to the microlens array unit 11*a*, and is located at the position where the distance from the microlens array unit 11*a* is longer than the focal distance of the microlens 11*aa*. FIG. 4C shows an image diagram when the light enters the microlens array unit 11b, in such a case that the microlens array unit 11b is arranged at the position far enough away from the focal plane of the microlens array unit 11a. The position is the same as the position shown in FIG. 4B. In FIG. 4C, as a matter of convenience of the explanations, the lens contours of the plural microlens 11ba arranged on the microlens array unit 11b are represented by broken lines.

Figure 4B:
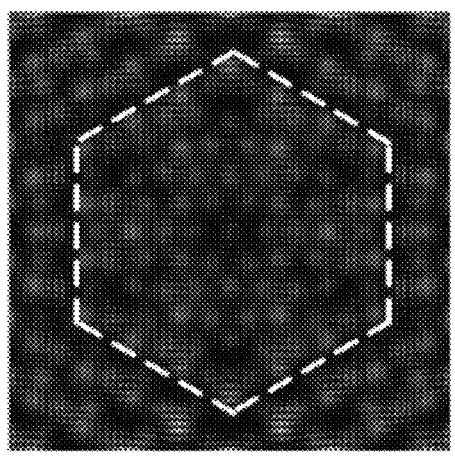
Figure 4C:
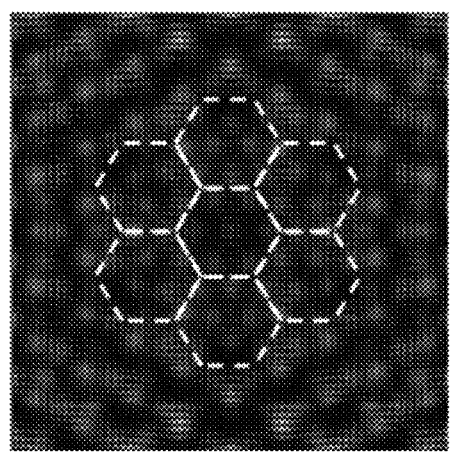

As shown in FIGS. 4B and 4C, by arranging the microlens array unit 11b at the position far enough away from the focal plane of the microlens array unit 11a, it is possible to make the light from one microlens 11aa of the microlens array unit 11a enter many microlenses 11ba of the microlens array unit 11b. Then, by collecting the light by each microlens 11ba of the microlens array unit 11b, the image is formed. Therefore, since the light can be appropriately dispersed, it becomes possible to form the uniform and even image (namely, uneven brightness is suppressed).

Here, as shown by the broken lines in FIG. 4B, there is a case that an image of a regular hexagonal shape corresponding to the lens contour of the microlens array unit 11a is generated on the plane far enough away from the focal plane of the microlens array unit 11a. Namely, there is a case that the image of the regular hexagonal shape due to the microlens array unit 11a is generated on the incident side of the microlens array unit 11b. There is a possibility that the above image of the regular hexagonal shape is perceived. In the embodiment, since the microlens array units 11a and 11b are formed so as to satisfy such a relationship that the regular hexagonal shapes being the lens contours of the microlenses 11aa and 11ba are rotated by 30 degrees with respect to each other (see FIGS. 3B and 3C), it is possible to suppress an unnecessary interference between the image of the regular hexagonal shape on the incident side of the microlens array unit 11b due to the microlens array unit 11a and the regular hexagonal shape being the lens contour of the microlens array unit 11b. Namely, according to the embodiment, since the direction of the vertices of the lens contour of the microlens array unit 11a is shifted from the direction of the vertices of the lens contour of the microlens array unit 11b, it is possible to blur the image of the regular hexagonal shape on the incident side of the microlens array unit 11b. Therefore, it becomes possible to appropriately suppress the influence of the shift of the position between the microlens array unit 11a and the microlens array unit 11b.

Even if the angle difference between the directions of the vertices being the lens contours of the microlens array units 11a and 11b is not 30 degrees, it is possible to suppress the above unnecessary interference due to the image of the regular hexagonal shape. Namely, while such an example that the angle difference between the directions of the vertices being the lens contours of the microlens array units 11a and 11b is 30 degrees is shown, the angle difference need not be exactly 30 degrees, and the angle difference may be a different angle from 30 degrees. This is because, if the directions of the vertices of the regular hexagonal shapes being the lens contours of the microlens array units 11a and 11b are shifted to some extent (namely, the directions of the vertices of the regular hexagonal shapes do not coincide), it is possible to blur the image of the regular hexagonal shape on the incident side by the microlens array unit 11b. However, according to an experiment, it is discovered that the effect of suppression of the unnecessary interference due to the image of the regular hexagonal shape increases when the angle difference between the directions of the vertices of the regular hexagonal shapes being the lens contours is 30 degrees or 90 degrees. Therefore, it is preferred that the angle difference between the directions of the vertices of the regular hexagonal shapes being the lens contours of the microlens array units 11a and 11b is substantially 30 degrees or substantially 90 degrees.

Meanwhile, in the above Non-Patent Reference 1, there is proposed the screen (hereinafter referred to as "screen according to comparative example") formed by the two microlens arrays. Basically, as for the screen according to the comparative example, the two microlens arrays are spaced at the focal distance of the microlens, and the two microlens arrays are arranged so that the directions of the vertices of the hexagonal shapes or the tetragonal shapes being the lens contours of the microlens coincide (namely, the angle difference between the directions of the vertices becomes 0). By the configuration of the comparative example, it is necessary to exactly adjust the position of the two microlens arrays. This is because, if the distance between the two microlens arrays does not coincide with the focal distance or the directions of the vertices of the lens contours of the microlens do not coincide, there sometimes occurs such a problem that the microlens takes in the unnecessary light or the influence of the inconsistency is perceived. Therefore, by the comparative example, there is a tendency that the time and cost of producing the screen increase.

On the contrary, in the embodiment, the microlens array units 11a and 11b are arranged at the position where the distance between the microlens array units 11a and 11b is at least longer than the focal distance of the microlenses 11aa and 11ba. According to the above embodiment, compared with the configuration of the comparative example in which the two microlens arrays are exactly spaced at the focal distance of the microlens, though the resolution tends to decrease, it is possible to reduce the accuracy necessary to arrange the microlens array units 11a and 11b opposite to each other.

Additionally, in the embodiment, the microlens array units 11a and 11b are arranged so that the directions of the vertices of the lens contours of the microlens array units 11a and 11b are shifted by the predetermined angle. Concretely, in the embodiment, it is not necessary that the directions of the vertices of the lens contours of the microlens array units 11a and 11b exactly coincide and the angle difference between the directions of the vertices of the lens contours is exactly set to the predetermined angle. According to the above embodiment, compared with the configuration of the comparative example in which the two microlens arrays are arranged so that the directions of the vertices of the lens contours of the microlens exactly coincide, it is possible to reduce the accuracy necessary for the arrangement regarding the direction of the vertices of the lens contour of the microlens array units 11a and 11b. Thus, according to the embodiment, compared with the comparative example, it becomes possible to produce the screen 11 with ease and at low cost.

Additionally, according to the embodiment, it is possible to appropriately cope with the light, the field angle of which is relatively large. Therefore, it is not necessary to use the condenser lens in the Patent Reference-1, which is located between the laser projector and the microlens array. So, according to the embodiment, it is possible to reduce the number of components in the image display device 1.

[Method for Producing Screen]

Next, a description will be given of a method for producing the screen 11 according to the embodiment, with reference to FIG. 5. Hereinafter, a description will be given of an example of the screen 11 including the rectangular-shaped microlens array units 11a and 11b.

At first, in the embodiment, the microlens array units 11a and 11b on which the microlenses 11aa and 11ba are arranged are produced, in such a state that the regular hexagonal shapes being the lens contours of the microlenses 11aa and 11ba are rotated by 15 degrees being half of 30 degrees, as shown in FIG. 5. Concretely, when an axis AX1 is defined as a horizontal axis of the microlens array units 11a and 11b, an axis AX2 is defined as a horizontal axis of the microlenses 11aa and 11ba, and an axis AX3 is defined as a vertical axis of the microlenses 11aa and 11ba, the microlens array units 11a and 11b on which the plural microlenses 11aa and 11ba are arranged are produced so that the horizontal axis AX2 of the microlenses 11aa and 11ba is inclined with respect to the horizontal axis AX1 of the microlens array units 11a and 11b by 15 degrees. In this case, in the embodiment, the same microlens array units 11a and 11b are produced. Namely, in the embodiment, two microlens array units on which the plural microlenses 11aa and 11ba are similarly arranged as shown in FIG. 5 are produced, and the two microlens array units are used as the microlens array units 11a and 11b.

Next, the microlens array units 11a and 11b produced by the above manner are arranged so that the sides on which the plural microlenses 11aa and 11ba are formed face each other and the microlens array units 11a and 11b are positioned opposite to each other at the position where the distance between the microlens array units 11a and 11b is the predetermined distance D (see FIG. 3A). Concretely, the microlens array units 11a and 11b are positioned opposite to each other so that the directions of the horizontal axes AX1 of the microlens array units 11a and 11b coincide. Therefore, the angle difference between the direction of the vertices of the regular hexagonal shape being the lens contour of the microlens 11aa arranged on the microlens array unit 11a and the direction of the vertices of the regular hexagonal shape being the lens contour of the microlens 11ba arranged on the microlens array unit 11b becomes 30 degrees. Namely, such a relationship that the regular hexagonal shapes being the lens contours of the microlenses 11aa and 11ba are rotated by 30 degrees with respect to each other is satisfied.

According to the above method for producing the screen 11, since it is not necessary to produce two microlens array units which are different in the configuration and it is only necessary to produce two microlens array units which are the same in the configuration, it becomes possible to produce the screen 11 with ease and at low cost.

When the microlens array units 11a and 11b are formed into a substantially circular shape (namely, a substantially discoid shape), it is not necessary to produce the microlens array units 11a and 11b on which the microlenses 11aa and 11ba are arranged in such a state that the regular hexagonal shapes being the lens contours are rotated by the 15 degrees. In this case, the same microlens array units 11a and 11b on which the microlenses 11aa and 11ba are arranged in such a state that the regular hexagonal shapes being the lens contours are not rotated may be produced, and the microlens array units 11a and 11b may be arranged opposite to each other so that the regular hexagonal shapes being the lens contours are rotated by 30 degrees with respect to each other.

[Modifications]

Hereinafter, a description will be given of modifications of the embodiment. As for the same configuration as the embodiment, explanations thereof are suitably omitted. Additionally, as for the configuration which is not especially explained, the configuration is the same as the above-described embodiment. For example, the method for producing the screen as shown in FIG. 5 can be suitably applied to the following modifications, too.

(First Modification)

In the above embodiment, the plural microlenses 11aa are formed on the side of the microlens array unit 11a which faces the microlens array unit 11b, and the plural microlenses 11ba are formed on the side of the microlens array unit 11b which faces the microlens array unit 11a. Meanwhile, in a first modification, plural microlenses of one of two microlens array units are formed on a side which faces the other, and plural microlenses of the other are formed on a side which does not face the one.

Figure 6A:
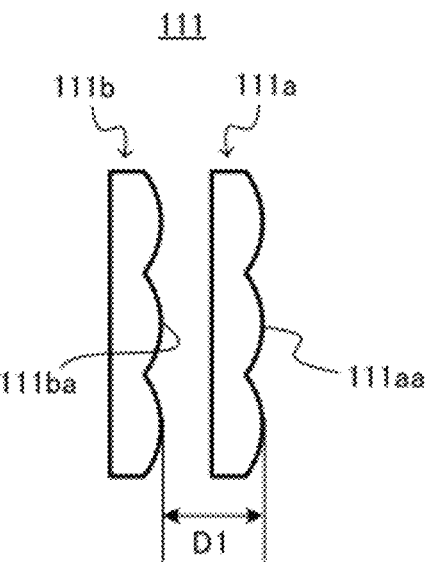
FIGS. 6A and 6B show configurations of a screen according to a first modification.
Figure 6B:
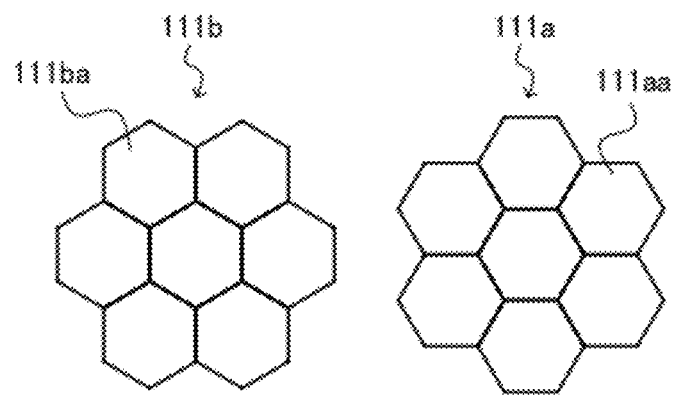

FIGS. 6A and 6B are diagrams showing a concrete configuration of a screen 111 according to the first modification. FIG. 6A shows a cross-sectional view of microlens array units 111a and 111b in the screen 111, which are cut by the plane normal to the traveling direction of the light. Concretely, the cross-sectional view shows parts of the microlens array units 111a and 111b in an enlarged manner. As shown in FIG. 6A, plural microlenses 111aa are formed on a side of the microlens array unit 111a which does not face the microlens array unit 111b, and plural microlenses 111ba are formed on a side of the microlens array unit 111b which faces the microlens array unit 111a. Namely, the microlens array units 111a and 111b are positioned opposite to each other so that the side of the microlens array unit 111a on which the plural microlenses 111aa are not formed and the side of the microlens array unit 111b on which the plural microlenses 111ba are formed face each other. Additionally, the microlens array units 111a and 111b are arranged opposite to each other at the position where the distance between the microlens array units 111a and 111b is a distance D1 which is at least longer than the focal distance of the microlenses 111aa and 111ba.

FIG. 6B shows a plan view of the microlens array units 111a and 111b. Concretely, the plan view shows parts of the microlens array units 111a and 111b, which are observed in the direction along the traveling direction of the light, in an enlarged manner. As shown in FIG. 6B, the plural microlenses 111aa and 111ba which are formed by the lens contour having the regular hexagonal shape in the plan view are arranged on the microlens array units 111a and 111b in the lattice pattern. Additionally, the microlens array units 111a and 111b are formed so that the angle difference between the direction of the vertices of the regular hexagonal shape being the lens contour of the microlens 111aa arranged on the microlens array unit 111a and the direction of the vertices of the regular hexagonal shape being the lens contour of the microlens 111ba arranged on the microlens array unit 111b becomes 30 degrees.

By the above screen 111 according to the first modification, it is possible to form the uniform and even image, and it is possible to appropriately suppress the influence of the shift of the position between the microlens array units 111a and 111b, too. Additionally, it becomes possible to produce the screen 111 with ease and at low cost.

(Second Modification)

A second modification is different from the embodiment and the first modification in that plural microlenses of one of two microlens array units are formed on a side which does not face the other, and plural microlenses of the other are formed on a side which does not face the one.

Figure 7A:
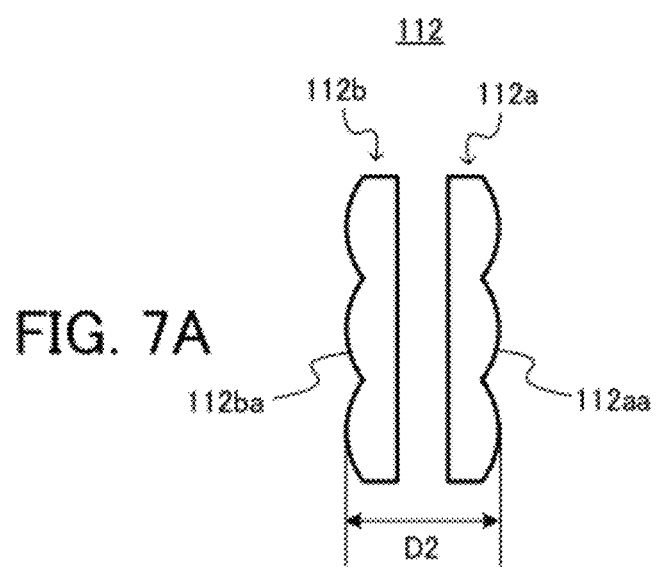
FIGS. 7A and 7B show configurations of a screen according to a second modification.
Figure 7B:
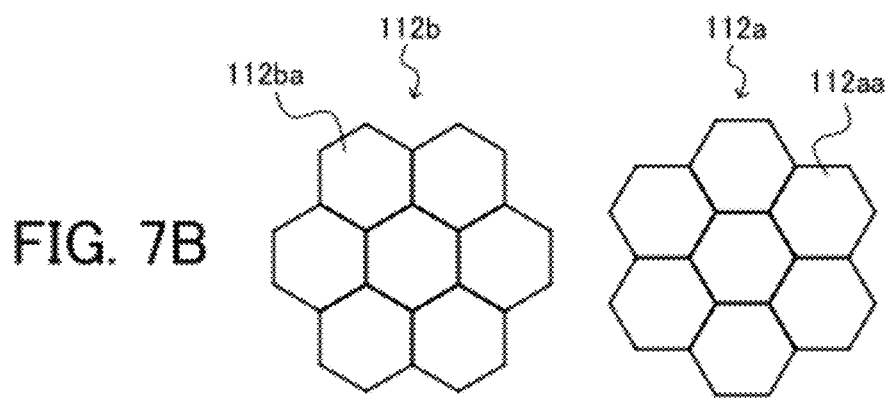

FIGS. 7A and 7B are diagrams showing a concrete configuration of a screen 112 according to the second modification. FIG. 7A shows a cross-sectional view of microlens array units 112a and 112b in the screen 112, which are cut by the plane normal to the traveling direction of the light. Concretely, the cross-sectional view shows parts of the microlens array units 112a and 112b in an enlarged manner. As shown in FIG. 7A, plural microlenses 112aa are formed on a side of the microlens array unit 112a which does not face the microlens array unit 112b, and plural microlenses 112ba are formed on a side of the microlens array unit 112b which does not face the microlens array unit 112a. Namely, the microlens array units 112a and 112b are positioned opposite to each other so that the sides of the microlens array units 112*a* and 112*b* on which the plural microlenses 112*aa* and 112*ba* are formed do not face each other. Additionally, the microlens array units 112*a* and 112*b* are arranged opposite to each other at the position where the distance between the microlens array units 112*a* and 112*b* is a distance D2 which is at least longer than the focal distance of the microlenses 112*aa* and 112*ba*.

FIG. 7B shows a plan view of the microlens array units 112*a* and 112*b*. Concretely, the plan view shows parts of the microlens array units 112*a* and 112*b*, which are observed in the direction along the traveling direction of the light, in an enlarged manner. As shown in FIG. 7B, the plural microlenses 112*aa* and 112*ba* which are formed by the lens contour having the regular hexagonal shape in the plan view are arranged on the microlens array units 112*a* and 112*b* in the lattice pattern. Additionally, the microlens array units 112*a* and 112*b* are formed so that the angle difference between the direction of the vertices of the regular hexagonal shape being the lens contour of the microlens 112*aa* arranged on the microlens array unit 112*a* and the direction of the vertices of the regular hexagonal shape being the lens contour of the microlens 112*ba* arranged on the microlens array unit 112*b* becomes 30 degrees.

By the above screen 112 according to the second modification, it is possible to form the uniform and even image, and it is possible to appropriately suppress the influence of the shift of the position between the microlens array units 112*a* and 112*b*, too. Additionally, it becomes possible to produce the screen 112 with ease and at low cost.

[Third Modification]

In the embodiment and the first and second modifications, the two microlens array units are separated. Meanwhile, in a third modification, two microlens array units are integrated, and plural microlenses are formed on both sides of a screen.

Figure 8A:
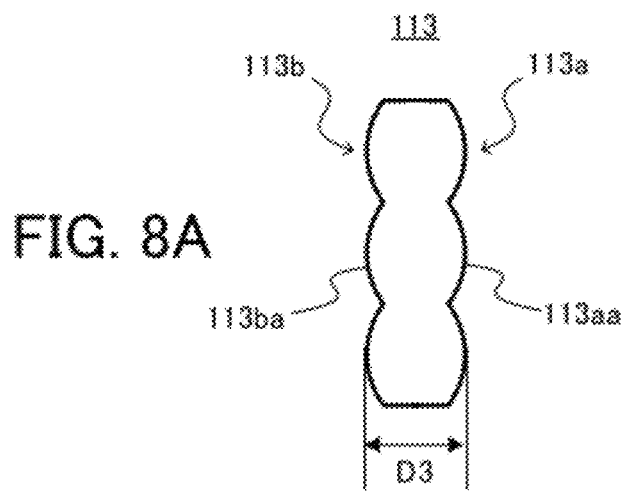
FIGS. 8A and 8B show configurations of a screen according to a third modification.
Figure 8B:
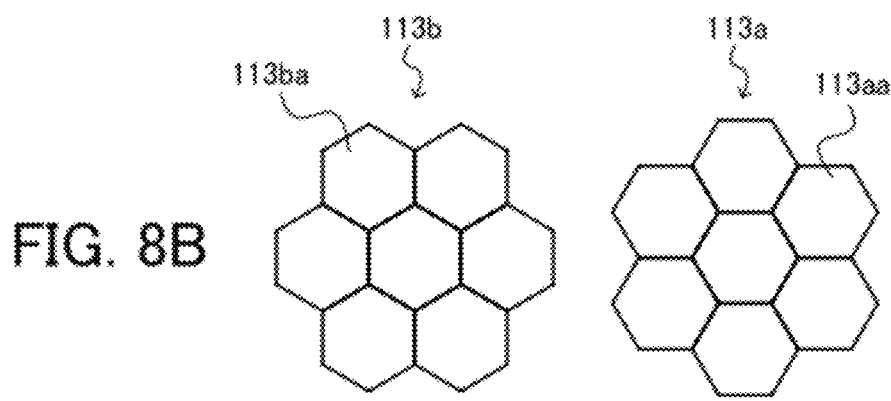

FIGS. 8A and 8B are diagrams showing a concrete configuration of a screen 113 according to the third modification. FIG. 8A shows a cross-sectional view of the screen 113 which are cut by the plane normal to the traveling direction of the light. Concretely, the cross-sectional view shows parts of the screen 113 in an enlarged manner. As shown in FIG. 8A, plural microlenses 113*aa* and 113*ba* are formed on two sides (namely, both sides) of the screen 113 which are opposed to each other. In other words, as for the screen 113, the microlens array unit 113*a* on which the plural microlenses 113*aa* are formed is integrated with the microlens array unit 113*b* on which the plural microlenses 113*ba* are formed. Namely, the opposite side of the side on which the plural microlenses 113*aa* of the microlens array unit 113*a* are formed abuts the opposite side of the side on which the plural microlenses 113*ba* of the microlens array unit 113*b* are formed, so as to integrate the microlens array unit 113*a* with the microlens array unit 113*b*.

Additionally, as for the screen 113, the plural microlenses 113*aa* and the plural microlenses 113*ba* are arranged at the position where the distance between the microlenses 113*aa* and 113*ba* is a distance D3 which is at least longer than the focal distance. Namely, the screen 13 has a thickness corresponding to the distance D3 which is at least longer than the focal distance of the microlenses 113*aa* and 113*ba*.

FIG. 8B shows a plan view of the microlens array units 113*a* and 113*b*. Concretely, the plan view shows parts of the microlens array units 113*a* and 113*b*, which are observed in the direction along the traveling direction of the light, in an enlarged manner. As shown in FIG. 8B, the plural microlenses 113*aa* and 113*ba* which are formed by the lens contour having the regular hexagonal shape in the plan view are arranged on the microlens array units 113*a* and 113*b* in the lattice pattern. Additionally, the microlens array units 113*a* and 113*b* are formed so that the angle difference between the direction of the vertices of the regular hexagonal shape being the lens contour of the microlens 113*aa* arranged on the microlens array unit 113*a* and the direction of the vertices of the regular hexagonal shape being the lens contour of the microlens 113*ba* arranged on the microlens array unit 113*b* becomes 30 degrees.

By the above screen 113 according to the third modification, it is possible to form the uniform and even image, and it is possible to appropriately suppress the influence of the shift of the position between the microlens array units 113*a* and 113*b*, too. Additionally, it becomes possible to produce the screen 113 with ease and at low cost.

In addition, according to the third modification, since the two microlens array units 113*a* and 113*b* in the screen 113 are integrated, it is only necessary to produce one component on which the microlens arrays are formed. Therefore, compared with the embodiment and the first and second modifications, it becomes possible to further reduce the cost necessary for the screen 113.

(Fourth Modification)

The screens according to the embodiment and the first to third modifications are formed by the microlens array unit comprising the microlenses, the lens contour of which has the regular hexagonal shape. Meanwhile, a screen according to a fourth modification is formed by a microlens array unit comprising microlenses, a lens contour of which has a square shape.

Figure 9:
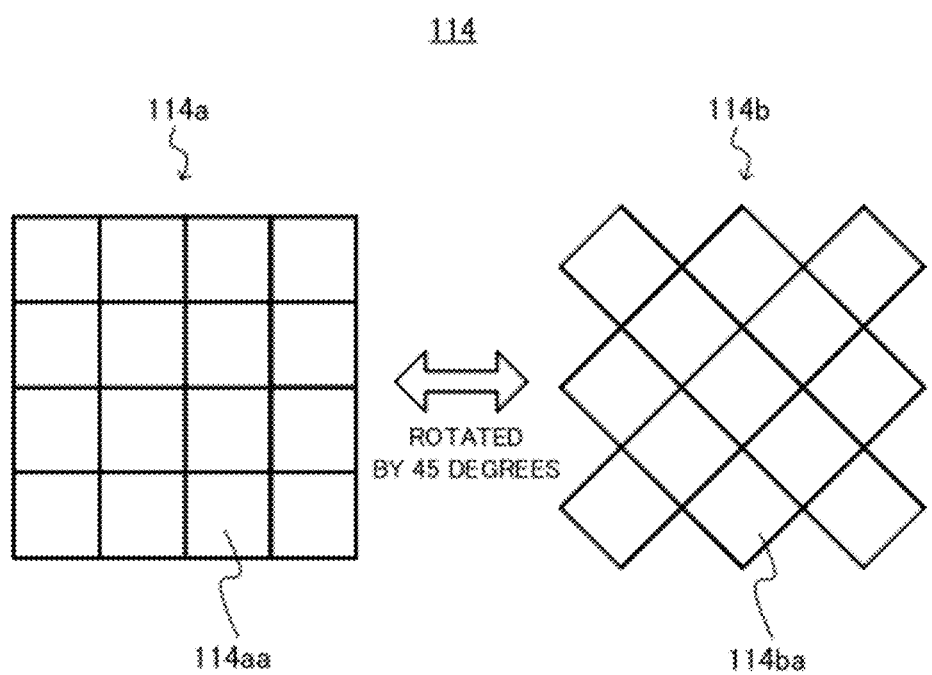
FIG. 9 shows a configuration of a screen according to a fourth modification.

FIG. 9 is a diagram showing a concrete configuration of a screen 114 according to the fourth modification. Concretely, FIG. 9 shows a plan view showing the microlens array units 114*a* and 114*b* in the screen 114, which are observed in the direction along the traveling direction of the light, in an enlarged manner. As shown in FIG. 9, plural microlenses 114*aa* and 114*ba* which are formed by the lens contour having the square shape in the plan view are arranged on the microlens array units 114*a* and 114*b* in the lattice pattern.

Additionally, the microlens array units 114*a* and 114*b* are formed so that the angle difference between the direction of the vertices of the square shape being the lens contour of the microlens 114*aa* arranged on the microlens array unit 114*a* and the direction of the vertices of the square shape being the lens contour of the microlens 114*ba* arranged on the microlens array unit 114*b* becomes 45 degrees. Namely, the plural microlenses 114*aa* and 114*ba* are arranged on the microlens array units 114*a* and 114*b* so as to satisfy such a relationship that the square shapes being the lens contours of the microlenses 114*aa* and 114*ba* are rotated by 45 degrees with respect to each other.

Additionally, the microlens array units 114*a* and 114*b* are arranged opposite to each other at the position where the distance between the microlens array units 114*a* and 114*b* is at least longer than the focal distance of the microlenses 114*aa* and 114*ba*. In this case, one of the arrangements (see FIG. 3A, FIG. 6A and FIG. 7A) in the embodiment and the first and second modifications is applied to the microlens array units 114*a* and 114*b*, or the microlens array units 114*a* and 114*b* are integrated as shown in the third modification.

By the above screen 114 according to the fourth modification, it is possible to form the uniform and even image, and it is possible to appropriately suppress the influence of the shift of the position between the microlens array units 114*a* and 114*b*, too. Additionally, it becomes possible to produce the screen 114 with ease and at low cost.

It is not limited that the microlenses 114*aa* and 114*ba* having the square shape is arranged as shown in FIG. 9.

Concretely, it is not limited that the microlenses 114aa and 114ba are arranged on the microlens array units 114a and 114b so that the positions of the adjoining microlenses 114aa and 114ba in a vertical direction (corresponding to the direction of the axis AX3 in FIG. 5. The same will apply hereinafter) coincide. As another example, microlenses can be arranged as shown in FIG. 10.

Figure 10:
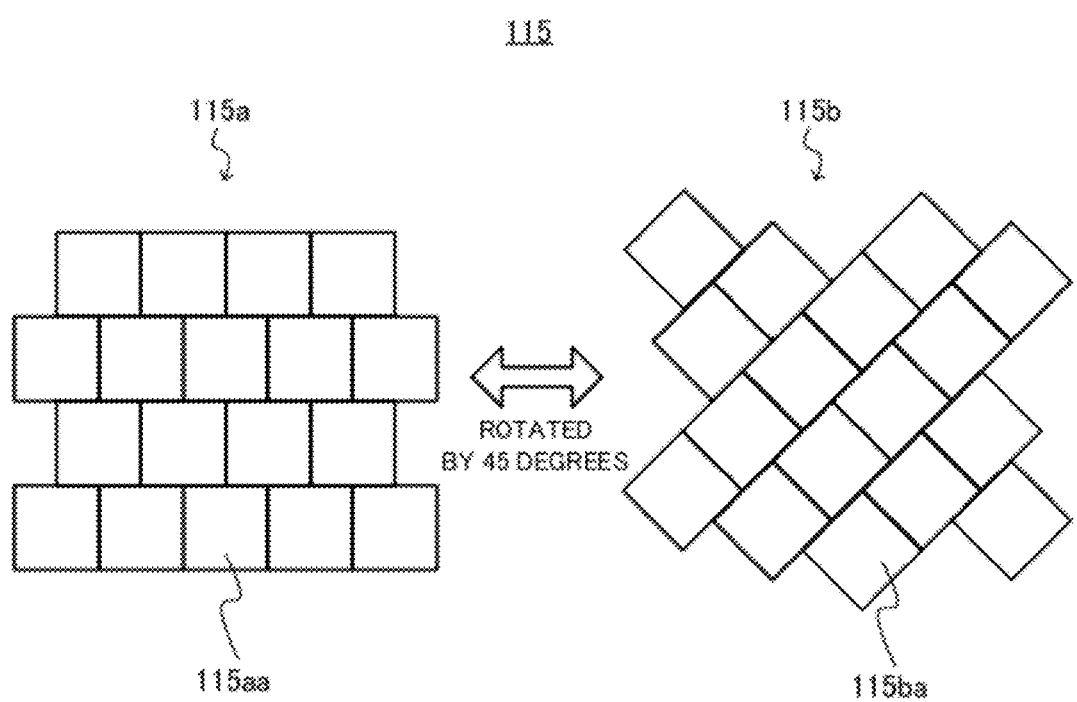
FIG. 10 shows a configuration of a screen according to another example of a fourth modification.

FIG. 10 is a diagram showing a concrete configuration of a screen 115 according to another example of the fourth modification. Concretely, FIG. 10 shows a plan view showing parts of microlens array units 115a and 115b in the screen 115, which are observed in the direction along the traveling direction of the light, in an enlarged manner. As shown in FIG. 10, plural microlenses 115aa and 115ba which are formed by the lens contour having the square shape in the plan view are arranged on the microlens array units 115a and 115b. Concretely, the microlenses 115aa and 115ba are arranged on the microlens array units 115a and 115b so that the positions of the adjoining microlenses 115aa and 115ba in the vertical direction are shifted by half of a length of one side of the square shape. Additionally, the microlens array units 115a and 115b are formed so that the angle difference between the direction of the vertices of the square shape being the lens contour of the microlens 115aa arranged on the microlens array unit 115a and the direction of the vertices of the square shape being the lens contour of the microlens 115ba arranged on the microlens array unit 115b becomes 45 degrees. By the screen 115, it is possible to achieve the same effect as the above screen 114, too.

While such an example that the angle difference between the directions of the vertices of the square shapes being the lens contours of the microlens array units 114a, 114b, 115a and 115b is 45 degrees is shown, the angle difference need not be exactly 45 degrees, and the angle difference may be a different angle from 45 degrees. The reason is as described in the section "[Operation and Effect of Screen]" in the embodiment. However, according to an experiment, it is discovered that the effect of suppression of the unnecessary interference on the incident side due to the image of the square shape increases when the angle difference between the directions of the vertices of the square shapes being the lens contours is 45 degrees or 135 degrees. Therefore, it is preferred that the angle difference between the directions of the vertices of the square shapes being the lens contours of the microlens array units 114a, 114b, 115a and 115b is substantially 45 degrees or substantially 135 degrees.

(Fifth Modification)

The screens according to the embodiment and the first to fourth modifications are formed by the microlens array unit comprising the microlenses, the lens contour of which has the regular hexagonal shape or the square shape. Meanwhile, a screen according to a fifth modification is formed by a microlens array unit comprising microlenses, a lens contour of which has a circular shape.

Figure 11:
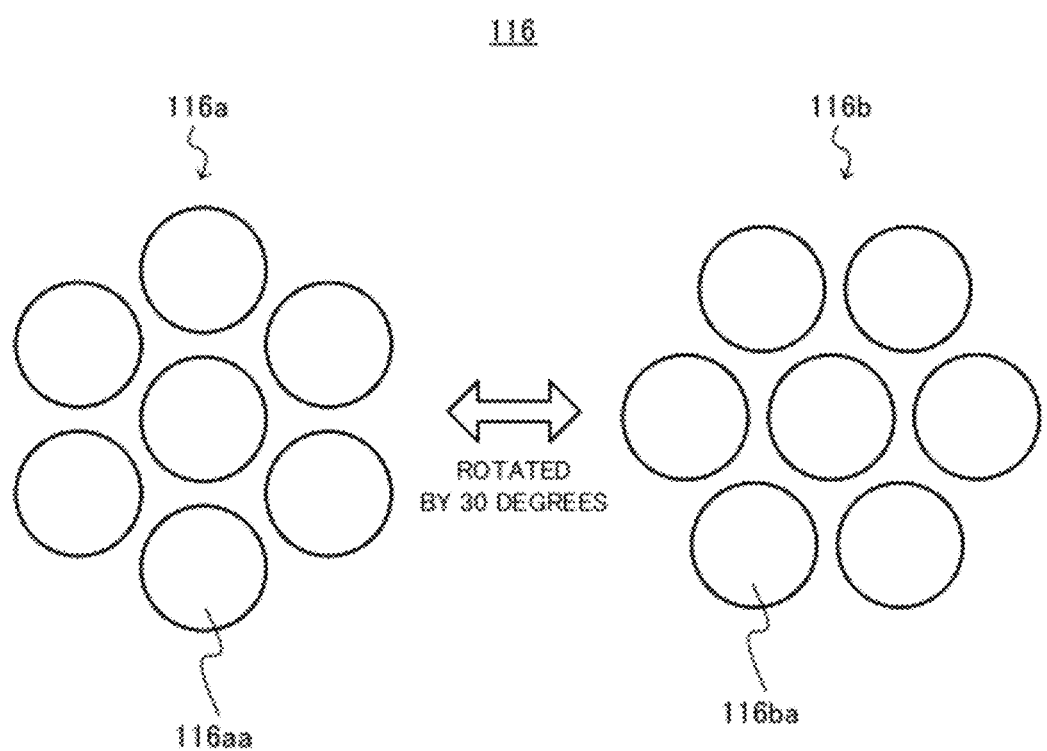
FIG. 11 shows a concrete configuration of a screen according to a fifth modification.

FIG. 11 is a diagram showing a concrete configuration of a screen 116 according to the fifth modification. Concretely, FIG. 11 shows a plan view showing parts of the microlens array units 116a and 116b in the screen 116, which are observed in the direction along the traveling direction of the light, in an enlarged manner. As shown in FIG. 11, plural microlenses 116aa and 116ba which are formed by the lens contour having the circular shape in the plan view are arranged on the microlens array units 116a and 116b.

Specifically, the microlenses 116aa and 116ba are arranged around one microlens, and are adjacently arranged at each predetermined angle with respect to vertices of the one microlens. FIG. 11 shows such an example that the predetermined angle is 60 degrees. Additionally, the microlenses 116aa arranged on the microlens array unit 116a and the microlens 116ba arranged on the microlens array unit 116b are shifted by 30 degrees, corresponding to half of the predetermined angle, with respect to the one microlens.

Additionally, the microlens array units 116a and 116b are arranged opposite to each other at the position where the distance between the microlens array units 116a and 116b is at least longer than the focal distance of the microlenses 116aa and 116ba. In this case, one of the arrangements (see FIG. 3A, FIG. 6A and FIG. 7A) in the embodiment and the first and second modifications is applied to the microlens array units 116a and 116b, or the microlens array units 116a and 116b are integrated as shown in the third modification.

In the fifth modification, it is preferred that a space between the microlenses 116aa and 116ba formed on the microlens array units 116a and 116b is masked so that the light does not go through the space.

By the above screen 116 according to the fifth modification, it is possible to form the uniform and even image, and it is possible to appropriately suppress the influence of the shift of the position between the microlens array units 116a and 116b, too. Additionally, it becomes possible to produce the screen 116 with ease and at low cost.

(Sixth Modification)

The screens according to the embodiment and the first to fourth modifications are formed by the microlens array unit comprising the microlenses, the lens contour of which has the regular polygonal shape (regular hexagonal shape or square shape) in which lengths of all sides are the same. Meanwhile, a screen according to a sixth modification is formed by a microlens array unit comprising microlenses, a lens contour of which has a polygonal shape not being the regular polygonal shape (namely, lengths of all sides in the polygonal shape are not the same).

FIGS. 12A and 12B are diagrams showing a concrete configuration of a screen 117 according to the sixth modification. Concretely, FIG. 12A shows a plan view showing parts of microlens array units 117a and 117b in the screen 117, which are observed in the direction along the traveling direction of the light, in an enlarged manner. As shown in FIG. 12A, plural microlenses 117aa and 117ba which are formed by the lens contour having a hexagonal shape in the plan view are arranged on the microlens array units 117a and 117b in the lattice pattern. Concretely, the microlenses 117aa and 117ba are formed by the hexagonal-shaped lens contour having a line-symmetric shape, not being the regular hexagonal shape (namely, lengths of all sides are not the same).

FIG. 12B shows directions of vertices of the lens contours of the microlenses 117aa and 117ba. As shown in FIG. 12B, the microlens array units 117a and 117b are formed so that the angle difference between the direction of the vertices of the hexagonal shape being the lens contour of the microlens 117aa arranged on the microlens array unit 117a and the direction of the vertices of the hexagonal shape being the lens contour of the microlens 117ba arranged on the microlens array unit 117b becomes 90 degrees. Namely, the plural microlenses 117aa and 117ba are arranged on the microlens array units 117a and 117b so as to satisfy such a relationship that the hexagonal shapes being the lens contours of the microlenses 117aa and 117ba are rotated by 90 degrees with respect to each other.

Additionally, the microlens array units 117a and 117b are arranged opposite to each other at the position where the distance between the microlens array units 117a and 117b is at least longer than the focal distance of the microlenses 117aa and 117ba. In this case, one of the arrangements (see FIG. 3A, FIG. 6A and FIG. 7A) in the embodiment and the first and second modifications is applied to the microlens array units 117a and 117b, or the microlens array units 117a and 117b are integrated as shown in the third modification.

By the above screen 117 according to the sixth modification, it is possible to form the uniform and even image, and it is possible to appropriately suppress the influence of the shift of the position between the microlens array units 117a and 117b, too. Additionally, it becomes possible to produce the screen 117 with ease and at low cost.

The hexagonal shape as shown in FIG. 12A is one example of the polygonal shape. It is not limited that the lens contour of the microlens is formed by the hexagonal shape. Additionally, it is not limited that the angle difference between the directions of the vertices of the hexagonal shapes being the lens contours is 90 degrees as shown in FIG. 12B.

(Seventh Modification)

While the above embodiment and modifications show such an example that the present invention is applied to the head-up display, it is not limited to this. Other than the head-up display, the present invention can be applied to a laser projector. Since a speckle noise normally poses a problem for the laser projector, it is not preferred that a screen for a liquid crystal projector is applied to the laser projector. However, since the screen in the present invention can appropriately suppress the speckle noise and can sufficiently ensure a view angle, the screen in the present invention can be preferably applied to the laser projector.

INDUSTRIAL APPLICABILITY

This invention can be used for image display devices such as a head-up display and a laser projector.

DESCRIPTION OF REFERENCE NUMBERS

1 Image Display Device
11 Screen
11a, 11b Microlens Array Unit
11aa, 11ba Microlens
111, 112, 113, 114, 115, 116, 117 Screen

The invention claimed is:

1. An optical element comprising:
a first microlens array unit and a second microlens array unit on which plural microlenses are arranged,
wherein the plural microlenses are formed by a lens contour having a polygonal shape in a plan view, and
wherein the first and second microlens array units are arranged opposite to each other at a position where a distance between the first and second microlens array units is at least longer than a focal distance of a microlens in the plural microlenses, and are formed so that a direction of vertices of the lens contour of the microlens arranged on the first microlens array unit is different from a direction of vertices of the lens contour of the microlens arranged on the second microlens array unit.

2. The optical element according to claim 1,
wherein the microlenses of the first and second microlens array units are formed by the lens contour having the polygonal shape, and are arranged so that sides of the polygonal shape are adjacent to each other.

3. The optical element according to claim 1,
wherein the first and second microlens array units are arranged opposite to each other at a position where the distance between the first and second microlens array units is equal to or larger than 1.5 times the focal distance and equal to or smaller than 3 times the focal distance.

4. The optical element according to claim 1,
wherein the polygonal shape is a regular hexagonal shape, and
wherein an angle difference between the direction of the vertices of the lens contour of the microlens arranged on the first microlens array unit and the direction of the vertices of the lens contour of the microlens arranged on the second microlens array unit is substantially 30 degrees or substantially 90 degrees.

5. The optical element according to claim 1,
wherein the polygonal shape is a square shape, and
wherein an angle difference between the direction of the vertices of the lens contour of the microlens arranged on the first microlens array unit and the direction of the vertices of the lens contour of the microlens arranged on the second microlens array unit is substantially 45 degrees or substantially 135 degrees.

6. The optical element according to claim 1, further comprising a first lens array and a second lens array,
wherein the first lens array has the first microlens array unit on one side, and
wherein the second lens array has the second microlens array unit on one side.

7. The optical element according to claim 6,
wherein the first microlens array unit is formed on a side of the first lens array which faces the second lens array, and
wherein the second microlens array unit is formed on a side of the second lens array which faces to the first lens array.

8. The optical element according to claim 6,
wherein the first microlens array unit is formed on a side of the first lens array which does not face a side of the second lens array on which the second microlens array unit is formed.

9. The optical element according to claim 6,
wherein the first microlens array unit is formed on a side of the first lens array which does not face the second lens array, and
wherein the second microlens array unit is formed on a side of the second lens array which does not face the first lens array.

10. The optical element according to claim 1,
wherein the first microlens array unit is formed on one side of the optical element, and the second microlens array unit is formed on the other side of the optical element.

11. A head-up display which includes the optical element according to claim 1 and makes a user perceive an image formed by the optical element as a virtual image at an eye position of the user.

12. A method for producing an optical element including a first microlens array unit and a second microlens array unit on which plural microlenses are arranged, comprising:
a first process which forms the plural microlenses on one side, which are arranged in such a state that a polygonal shape being a lens contour of a microlens in the plural microlenses is rotated by half of a predetermined degrees, so as to produce the first and second microlens array units; and
a second process which arranges the first and second microlens array units produced in the first process so that the first and second microlens array units are positioned opposite to each other at a position where a distance between the first and second microlens array units is at least longer than a focal distance of the microlens, so as to produce the optical element.

13. A method for producing an optical element including a first microlens array unit and a second microlens array unit on which plural microlenses are arranged, comprising:
- a first process which forms the plural microlenses on one side so as to produce the first and second microlens array units; and
- a second process which arranges the first and second microlens array units opposite to each other at a position where a distance between the first and second microlens array units is at least longer than a focal distance of a microlens in the plural microlenses, and arranges the first and second microlens array units so that an angle difference between a direction of vertices of a polygonal shape being a lens contour of the microlens formed on the first microlens array unit and a direction of vertices of a polygonal shape being a lens contour of the microlens formed on the second microlens array unit becomes a predetermined angle, so as to produce the optical element.

14. An optical element comprising:
- a first microlens array unit and a second microlens array unit on which plural microlenses are arranged,
- wherein the plural microlenses are formed by a lens contour having a regular polygonal shape in a plan view, and
- wherein the first and second microlens array units are arranged opposite to each other at a position where a distance between the first and second microlens array units is at least longer than a focal distance of a microlens in the plural microlenses, and are formed so that an angle difference between a direction of vertices of the lens contour of the microlens arranged on the first microlens array unit and a direction of vertices of the lens contour of the microlens arranged on the second microlens array unit becomes half of an internal angle of the regular polygonal shape.

15. An optical element comprising:
- a first microlens array unit and a second microlens array unit on which plural microlenses are arranged at equal distances,
- wherein the microlenses are arranged around one microlens and are adjacently arranged at each predetermined angle with respect to vertices of the one microlens,
- wherein the first and second microlens array units are arranged opposite to each other at a position where a distance between the first and second microlens array units is at least longer than a focal distance of the microlens, and
- wherein the microlens arranged on the first microlens array unit and the microlens arranged on the second microlens array unit are shifted by half of the predetermined angle with respect to the one microlens.

16. The optical element according to claim 15,
- wherein a space between the microlenses formed on the first and second microlens array units is masked so that a light does not go through the space.

* * * * *